United States Patent [19]

Asada

[11] Patent Number: 5,184,506

[45] Date of Patent: Feb. 9, 1993

[54] TRANSMISSION INPUT SHAFT SPEED DETECTING APPARATUS UTILIZING OIL PUMP PRESSURE

[75] Inventor: Michio Asada, Shizuoka, Japan

[73] Assignee: Jatco Corporation, Japan

[21] Appl. No.: 723,220

[22] Filed: Jun. 28, 1991

[30] Foreign Application Priority Data

Jul. 6, 1990 [JP] Japan .................................. 2-180189

[51] Int. Cl.⁵ ............................................ G01M 19/00
[52] U.S. Cl. ..................................... 73/118.1; 73/518; 73/521
[58] Field of Search ...................... 73/118.1, 518, 521; 324/160, 166

[56] References Cited

U.S. PATENT DOCUMENTS

| | | | |
|---|---|---|---|
| 3,395,718 | 8/1968 | Wolff | 73/521 |
| 3,574,475 | 8/1971 | Wolff | 324/160 |
| 4,259,637 | 3/1981 | Bloomfield et al. | 324/166 |
| 4,428,353 | 1/1984 | Stahly et al. | 123/389 |
| 4,911,000 | 3/1990 | Takase et al. | 73/118.1 |

Primary Examiner—Hezron E. Williams
Assistant Examiner—Howard Wisnia
Attorney, Agent, or Firm—Ronald P. Kananen

[57] ABSTRACT

An apparatus for use with a transmission including an input shaft, and an oil pump rotatable in synchronism with the input shaft to detect a speed of rotation of the input shaft. The apparatus comprises a pressure sensor sensitive to an oil pressure discharged from the oil pump for producing an electrical signal indicative of a sensed pressure. The electrical signal is utilized to detect the input shaft rotation speed.

4 Claims, 5 Drawing Sheets

FIG. 2

|   | C18 | C20 | C22 | C24 | B28 | B26 | OWC 30 | OWC 29 | GEAR RATIO | $\alpha_1 = 0.440$<br>$\alpha_2 = 0.493$ |
|---|---|---|---|---|---|---|---|---|---|---|
| DRIVE 1ST. |  |  | ○ |  |  |  | ○ | ○ | $\dfrac{1+\alpha_2}{\alpha_2}$ | 3.027 |
| DRIVE 2ND. |  | ○ | ○ |  | ○ |  | ○ |  | $\dfrac{\alpha_1+\alpha_2+\alpha_1\alpha_2}{\alpha_2(1+\alpha_1)}$ | 1.619 |
| DRIVE 3RD. |  | ○ | ○ | ○ |  |  | ○ |  | 1 | 1.000 |
| DRIVE 4TH. |  |  | (○) | ○ | ○ |  |  |  | $\dfrac{1}{1+\alpha_1}$ | 0.694 |
| COAST 1ST. |  |  | (○) |  |  | ○ | (○) | (○) |  |  |
| COAST 2ND. |  | ○ | (○) | ○ | ○ |  | (○) |  |  |  |
| COAST 3RD. |  | ○ | (○) | ○ |  |  | (○) |  |  |  |
| COAST 4TH. |  |  | (○) |  | ○ |  |  |  |  |  |
| REV. | ○ |  |  |  |  | ○ |  |  | $-\dfrac{1}{\alpha_1}$ | −2.272 |

○ =ENGAGED

ONE ROTATION

TRANSMISSION INPUT SHAFT SPEED DETECTING APPARATUS UTILIZING OIL PUMP PRESSURE

BACKGROUND OF THE INVENTION

This invention relates to an apparatus for use with a transmission including an input shaft, and an oil pump rotatable in synchronism with the input shaft to detect a speed of rotation of the input shaft.

In order to control automatic or stepless transmissions, various types of engine speed sensors have been employed. One type of engine speed sensor utilizes the primary current of an engine ignition coil. Another type of engine speed sensor utilizes a crankshaft position sensor having a magnetic pickup transducer associated with an ignition distributor. However, the type of the engine speed sensor used in controlling a transmission is different from one engine type to another. For this reason, troublesome operations are required to adjust the transmission control unit for use with the engine speed sensor.

SUMMARY OF THE INVENTION

Therefore, it is a main object of the invention to provide a transmission input shaft speed detecting apparatus which can provide an accurate transmission control regardless of the type of the engine used with the transmission.

There is provided, in accordance with the invention, an apparatus for use with a transmission including an input shaft, and an oil pump rotatable in synchronism with the input shaft to detect a speed of rotation of the input shaft. The apparatus comprises means sensitive to an oil pressure discharged from the oil pump for producing an electrical signal indicative of a sensed pressure, and means for calculating the input shaft rotation speed based upon the electrical signal.

BRIEF DESCRIPTION OF THE DRAWINGS

This invention will be described in greater detail by reference to the following description taken in connection with the accompanying drawings, in which:

FIG. 2 is a table showing the engaged and disengaged states of the hydraulic clutches and brakes for selected gear positions;

DETAILED DESCRIPTION OF THE INVENTION

Figure 1:
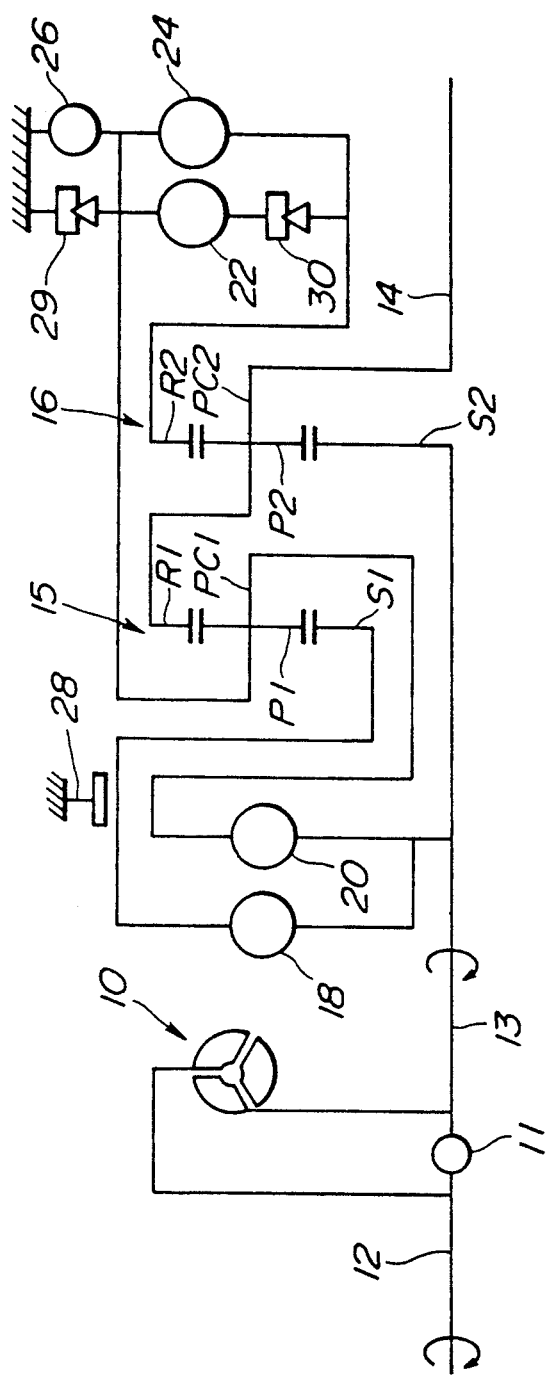
FIG. 1 is a schematic diagram showing a transmission to which the invention is applicable.

With reference to the drawings, and in particular to FIG. 1, there is shown a schematic diagram of an automatic transmission to which the input speed detecting apparatus of the invention is applicable. The automatic transmission includes an input shaft 13 to which a drive is transmitted from an engine output shaft 12 through a torque converter 10 including a lockup clutch 11, and an output shaft 14 from which a drive is transmitted to a final drive (not shown). The automatic transmission also includes a first planetary gear unit 15, a second planetary gear unit 16, a reverse clutch 18, a high clutch 20, a forward clutch 22, an overrunning clutch 24, a low and reverse brake 26, a band brake 28, a low one-way clutch 29 and a forward one-way clutch 30.

The first planetary gear unit 15 includes a sun gear S1, an internal gear R1, a pinion gear P1 and a pinion carrier PC1 which carries the pinion gear P1. The second planetary gear unit 16 includes a sun gear S2, an internal gear R2, a pinion gear P2 and a pinion carrier PC2 which carries the pinion gear P2. The carrier PC1 is connected through the high clutch 20 to the input shaft 13. The sun gear S1 is connected through the reverse clutch 18 to the input shaft 13. The carrier PC1 is connected to the internal gear R2 through the forward clutch 22 and the forward one-way clutch 30 connected in series with the forward clutch 22. The carrier PC1 is also connected to the internal gear R2 through the overrunning clutch 24 connected in parallel with the series connection of the forward clutch 22 and the forward one-way clutch 30. The sun gear S2 is directly connected to the input shaft 13. The internal gear R1 is directly connected to the output shaft 14. The carrier PC2 is directly connected to the output shaft 14. The carrier PC1 is fixed to the transmission casing through the low and reverse brake 26. The sun gear S1 is fixed to the transmission casing through the band brake 28. The low one-way clutch 29 is directed to permit rotation of the carrier PC1 in the same direction as the engine output shaft 12 but not vice versa.

FIG. 2 is a table showing the engaged and disengaged states of the hydraulic clutches 18, 20, 22 and 24 and the hydraulic brakes 26 and 28 for selected gear positions including first-, second-, third- and fourth-forward speeds and a reverse position. As can be seen from FIG. 2, the automatic transmission produces four forward speed ratios and a reverse speed ratio. In FIG. 2, the character α1 indicates a gear ratio of the sun gear S1 to the internal gear R1, and the character α2 indicates a gear ratio of the sun gear S2 to the internal gear R2.

Figure 3:
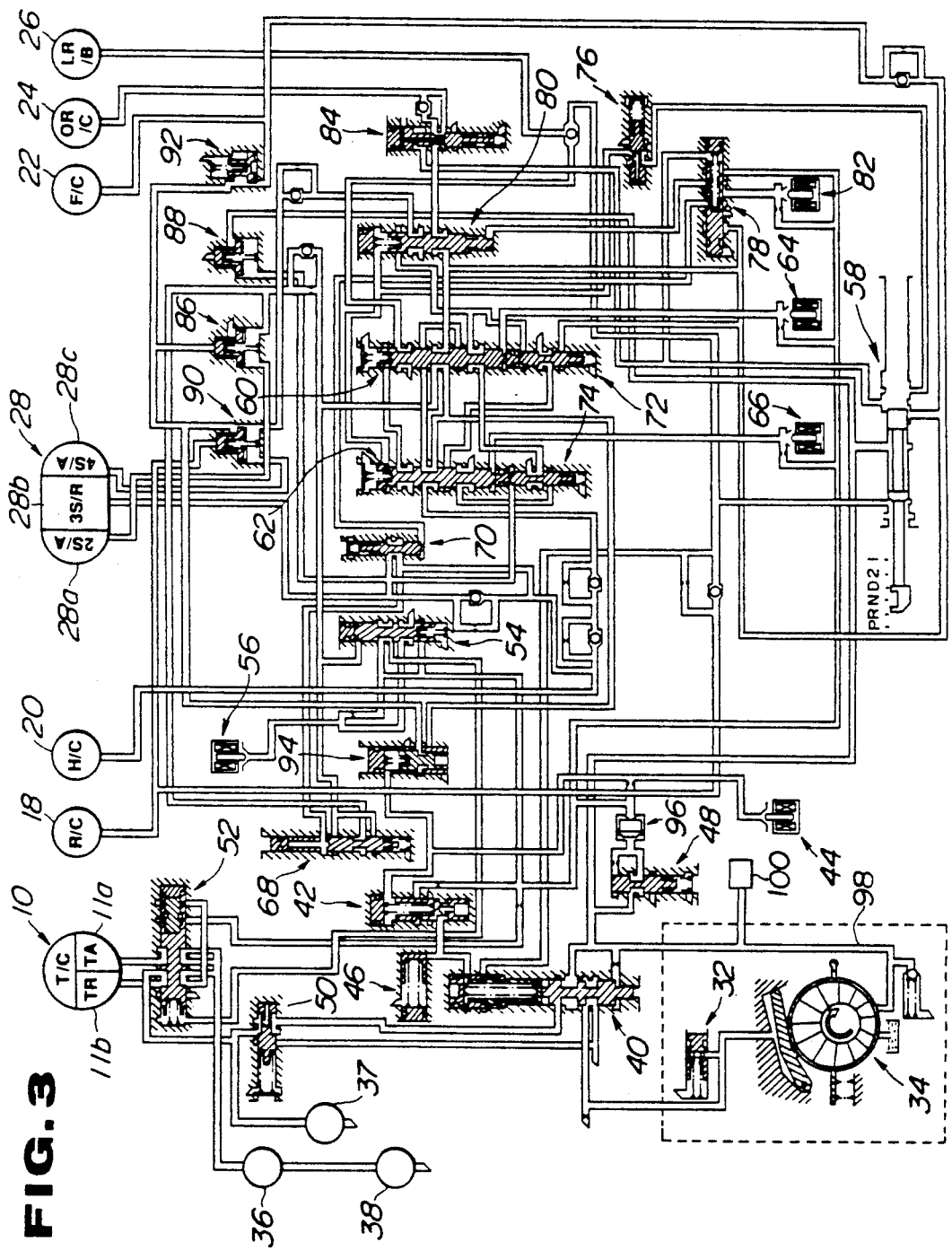
FIG. 3 is a diagram showing a hydraulic control system for use with the transmission of FIG. 1.

Referring to FIG. 3, there is illustrated a hydraulic control system capable of engaging and disengaging the hydraulic clutches and brakes of the transmission of FIG. 1. The hydraulic control system includes various components connected as shown in FIG. 3. These components include a pressure regulator valve 40, a pressure modifier valve 42, a line pressure solenoid 44, a modifier pressure accumulator 46, a pilot valve 48, a torque converter relief valve 50, a lockup control valve 52, a first shuttle valve 54, a lockup solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a fast reduction valve 76, a second shuttle valve 78, an overrunning clutch control valve 80, an overrunning clutch solenoid 82, an overrunning clutch reduction valve 84, a 1-2 accumulator 86, a 2-3 accumulator 88, a 3-4 accumulator 90, an N-D accumulator 92, an accumulator control valve 94, a filter 96, a variable-capacity vane pump 34 equipped with a feedback accumulator 32, an oil cooler 36, a front lubrication circuit 37, and a rear lubrication circuit 38. The hydraulic control system is connected to the torque converter 10 having apply and release chambers 11a and 11b provided for the torque converter 10, the forward clutch 22, the high clutch 20, the band brake 28 having a second-speed apply chamber 28a, a third-speed release chamber 28b and a fourth-speed apply chamber 28c, the reverse clutch 18, the low/reverse brake 26 and a overrunning clutch 24. The hydraulic control system is disclosed in greater detail in Japanese Patent Kokai No. 63-2516521.

A pressure sensor 100 is provided in an oil passage 98 connected to the discharge side of the oil pump 34. The pressure sensor 100 senses the hydraulic pressure discharged from the oil pump 34 and produces an electrical signal indicative of the sensed hydraulic pressure.

Figure 4:
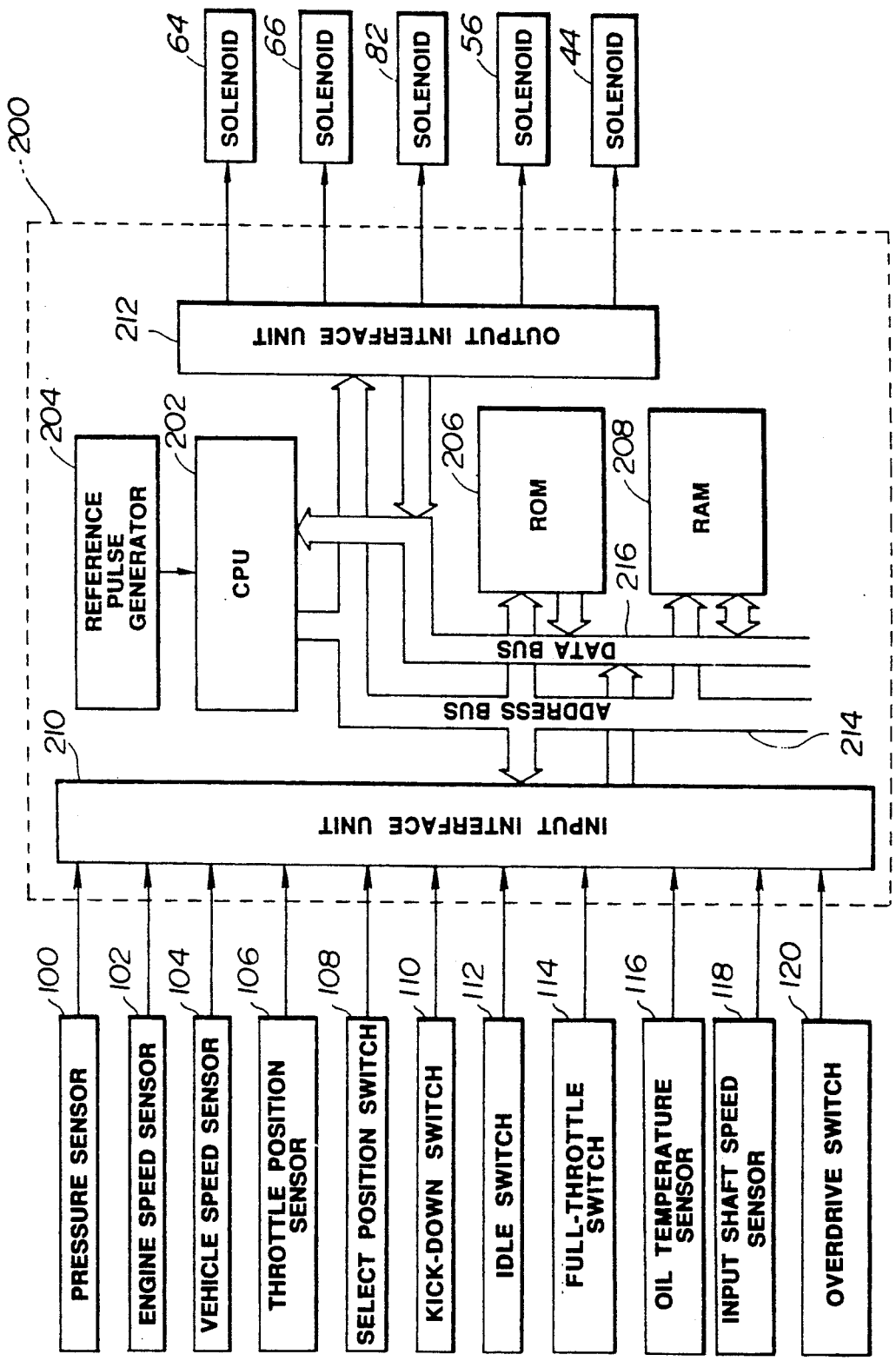
FIG. 4 is a schematic block diagram showing a control unit for controlling the solenoids used in the hydraulic control system of FIG. 3.

Referring to FIG. 4, there is illustrated a control unit 200 which includes a central processing unit (CPU) 202, a reference signal generator 204, a read only memory (ROM) 206, a random access memory (RAM) 208, an input interface unit 210 and an output interface unit 212. The central processing unit 202 communicates with the rest of the computer via address bus 214 and data bus 216. The input interface unit 210 receives inputs from the pressure sensor 100 and also from various sensors including a vehicle speed sensor 102, a vehicle speed sensor 104, a throttle valve position sensor 106, a select position switch 108, a kickdown switch 110, an idle switch 112, a full-throttle switch 114, an oil temperature sensor 116, an input shaft speed sensor 118 and an overdrive switch 120. The input interface circuit 210 includes an analog-to-digital converter, a filter, a waveform shaper, and so forth. The A/D converter receives analog signals from the sensors and converts them into digital form for application to the central processing unit 202. The A to D conversion process is initiated on command from the central processing unit 202 which selects the input channel to be converted. The read only memory 206 contains the program for operating the central processing unit and further contains appropriate data in look-up tables used in controlling the automatic transmission. Control words are periodically transferred by the central processing unit 202 to the output interface circuit 212 which converts the received control words to drive signals for application to drive the solenoids 44, 56, 64, 66 and 82 provided in the hydraulic control system of FIG. 3.

Figure 5A:
FIG. 5A shows a voltage waveform of an ignition-system spark-pulse signal.
Figure 5B:
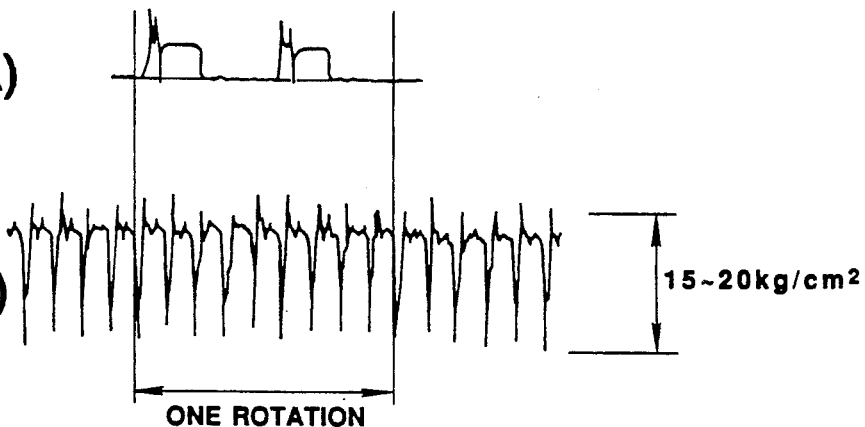
FIG. 5B shows a voltage waveform of the pressure indication signal fed from a pressure sensor used in the transmission input shaft speed detecting apparatus of the invention.

FIG. 5(A) shows a voltage waveform showing an ignition-system spark-pulse signal produced to the ignition system (not shown) to cause an ignition spark in a four-cylinder engine. FIG. 5(B) shows a voltage waveform showing the pressure indication signal fed from the pressure sensor 100 to the control unit 20. The pressure indication signal is an electrical representation of the pressure vibration which is caused by rotation of the vanes in the oil pump 34 in the case where the oil pump 34 is a vane type pump having a number of vanes provided in a rotor rotatable in synchronism with the input shaft 13 of the transmission or by rotation of the teeth in the oil pump 34 in the case where the oil pump 34 is a gear type pump having a number of teeth formed on a gear wheel rotatable in synchronism with the input shaft 13 of the transmission. The pressure indication signal contains a predetermined number (equal to the number of the vanes or gear teeth of the oil pump 34) of pulses per one rotation of the oil pump 34. For example, when the oil pump 34 has nine vanes or teeth, nine pulses are produced per one rotation of the oil pump 34, as shown in FIG. 5(B). The central processing unit 202 counts the pulses to accumulate a count and utilizes the accumulated count to calculate the speed of rotation of the input shaft 13 of the automatic transmission.

Figure 6:
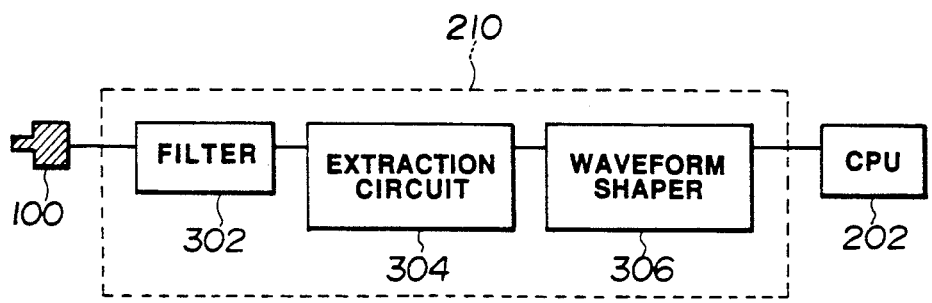
FIG. 6 is a schematic block diagram showing a pressure indication signal processing circuit.
Figure 7A:
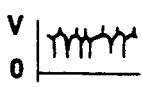
FIGS. 7A, 7B and 7C shows voltage waveforms produced at various points in the pressure indication signal processing circuit.
Figure 7B:
Figure 7C:

Referring to FIG. 6, the input interface unit 210 includes a filter 302 which receives the pressure indication signal and removes the DC component from the pressure indication signal. The waveform of the pressure indication signal is shown in FIG. 7A, and the waveform of the filtered signal is shown in FIG. 7B. The filtered signal is fed from the filter 302 to an extraction circuit 304 which extracts the first order component of the filtered signal. The extracted component is fed from the extraction circuit 304 to a waveform shaper 306 which shapes the extracted component into a series of electrical pulses for application to the central processing unit 202. The waveform of the pulse signal is shown in FIG. 7C.

According to the invention, the speed of rotation of the transmission input shaft 13 is detected based upon a pressure indication electrical signal produced from a pressure sensor provided to sense the oil pressure discharged from the oil pump 34. It is, therefore, possible to provide an accurate transmission control regardless of the type of engine used with the transmission. In addition, the number of the pulses produced for every rotation of the oil pump 34 is equal to the number of the vanes or teeth of the oil pump 34. In other words, the number of pulses produced from the pressure sensor 100 is much greater than the pulses produced from a crankshaft position sensor. It is, therefore, possible to improve the rotation control accuracy.

What is claimed is:

1. An apparatus for use with a transmission including an input shaft, and an oil pump including a rotor having a number of vanes rotatable in synchronism with the input shaft to detect a speed of rotation of the input shaft, the apparatus comprising:

first means sensitive to an oil pressure discharged from the oil pump for producing an electrical signal having pulses caused by variations in a sensed oil pressure; and second means for calculating the input shaft rotation speed based upon the electrical signal.

2. The apparatus as claimed in claim 1, wherein the second means includes means for counting the pulses to accumulate a count, and means for calculating the input shaft rotation speed based upon the accumulated count.

3. An apparatus for use with a transmission including an input shaft, and an oil pump including a gear wheel having a number of gear teeth rotatable in synchronism with the input shaft, the apparatus comprising:

first means sensitive to an oil pressure discharged from the oil pump for producing an electrical signal having pulses caused by variations in a sensed oil pressure; and second means for calculating the input shaft rotation speed based upon the electrical signal.

4. The apparatus as claimed in claim 3, wherein the second means includes means for counting the pulses to accumulate a count, and means for calculating the input shaft rotation speed based upon the accumulated count.

* * * * *